(12) United States Patent
Milette et al.

(10) Patent No.: US 8,075,198 B2
(45) Date of Patent: Dec. 13, 2011

(54) REVERSIBLE FIBER CONNECTOR WITH MECHANICAL SLIDING SPLICE

(75) Inventors: Luc Milette, Montreal (CA); Moise Levy, Laval (CA)

(73) Assignee: Belden CDT (Canada) Inc., Saint-Laurent (CA)

( * ) Notice: Subject to any disclaimer, the term of this patent is extended or adjusted under 35 U.S.C. 154(b) by 351 days.

(21) Appl. No.: 12/489,793

(22) Filed: Jun. 23, 2009

(65) Prior Publication Data
US 2009/0317037 A1 Dec. 24, 2009

Related U.S. Application Data

(60) Provisional application No. 61/074,823, filed on Jun. 23, 2008.

(51) Int. Cl.
*G02B 6/36* (2006.01)
(52) U.S. Cl. ............................... 385/83; 385/76; 385/87
(58) Field of Classification Search ..................... 385/76, 385/77, 78, 83, 84, 86, 87
See application file for complete search history.

(56) References Cited

U.S. PATENT DOCUMENTS

| | | | |
|---|---|---|---|
| 4,435,038 A | 3/1984 | Soes et al. | |
| 4,669,820 A | 6/1987 | Ten Berge | |
| 5,138,681 A | 8/1992 | Larson et al. | |
| 5,341,448 A | 8/1994 | Huebscher | |
| 5,394,496 A | 2/1995 | Caldwell et al. | |
| 5,984,532 A | 11/1999 | Tamaki et al. | |
| 6,179,482 B1 | 1/2001 | Takizawa et al. | |
| 6,379,054 B2 | 4/2002 | Throckmorton et al. | |
| 6,604,867 B2 | 8/2003 | Radek et al. | |
| 7,001,084 B2 | 2/2006 | Carpenter et al. | |
| 7,014,372 B2 | 3/2006 | Watte et al. | |
| 7,178,990 B2 | 2/2007 | Caveney et al. | |
| 7,241,056 B1 | 7/2007 | Kuffel et al. | |
| 7,258,496 B2 | 8/2007 | Saito et al. | |
| 7,264,410 B1 | 9/2007 | Doss et al. | |
| 7,280,733 B2 | 10/2007 | Larson et al. | |
| 7,346,256 B2 | 3/2008 | Marrs et al. | |
| 7,887,244 B2 * | 2/2011 | Milette et al. ................... 385/76 |
| 2006/0153515 A1 | 7/2006 | Honma et al. | |
| 2008/0075407 A1 | 3/2008 | Saito et al. | |

* cited by examiner

*Primary Examiner* — Kevin S Wood
(74) *Attorney, Agent, or Firm* — Goudreau Gage Dubuc; Hugh Mansfield

(57) ABSTRACT

A connector assembly for reversibly terminating an optical fiber comprises a housing having a cavity extending along a longitudinal axis. An elongate member having a groove extending along a surface thereof is provided within the cavity. An end portion of the fiber is aligned with a fiber stub within the groove such that the stub's splicing face is positioned opposite the fiber's splicing face. A splice anvil is mounted about the member with the anvil's clamping surface overlapping the abutting stub and fiber splicing faces. The clamping mechanism comprises step surfaces arranged along the member's surface adjacent the groove. When the anvil is moved from the released position to the clamped position, the anvil's inner surface is moved along the step surfaces in a direction perpendicular to the longitudinal axis towards the groove, the anvil's clamping surface bringing a clamping force to bear on the abutting fiber and fiber stub.

19 Claims, 7 Drawing Sheets

REVERSIBLE FIBER CONNECTOR WITH MECHANICAL SLIDING SPLICE

CROSS REFERENCE TO RELATED APPLICATIONS

This application claims priority on U.S. Provisional Application No. 61/074,823, filed on Jun. 23, 2008 and which is herein incorporated by reference in its entirety.

FIELD OF THE INVENTION

The present invention relates to a reversible fiber connector with mechanical sliding splice for aligning and retaining an optical fiber stub and an adjoining optical fiber.

BACKGROUND OF THE INVENTION

Fiber optic systems are well-known for their difficult terminations. In particular, alignment of mating optical fibers within a fiber optic connector is critical to the connector's performance. To accurately align an optical fiber stub of a connector with a mating field optical fiber inserted into the connector, a biasing force is typically applied to at least one mechanical splice component comprised within the connector. In this manner, the optical fiber stub and the field optical fiber are both retained between opposing splice components, which are biased together by an actuator. Once the optical fibers are aligned and retained in optical continuity, the field optical fiber is then strain relieved to the connector by crimping a buffered portion of the field fiber.

Prior art connectors are however complex as fiber alignment and strain relief are typically performed in more than one step using more than one element of the connector, thus requiring additional materials and proving time and cost consuming. Another drawback is that the termination assembly is typically non-reusable since once the optical fibers have been strain relieved by applying a crimp, it is usually not possible to reverse the splice without destroying the connector assembly or damaging the optical fiber. Indeed, the crimping operation has the tendency to pull the field fiber and fiber stub apart or damage the signal-passing function of the interface. Also, although some connectors use a reusable termination system, such connectors generally require a specific activation tool dedicated to each type of system.

What is therefore needed, and an object of the present invention, is an easy to use fiber optic connector that reversibly and non-destructively terminates a field fiber inserted therein, thus alleviating the need for a second operation to crimp on the fiber cable.

SUMMARY OF THE INVENTION

More specifically, in accordance with the present invention, there is provided a connector assembly for reversibly terminating an optical fiber, the assembly comprising an elongate housing comprising a front end, a rear end and a cavity extending therebetween along a longitudinal axis. The assembly further comprises an elongate member mounted within the cavity and comprising a first end, a second end and an alignment groove extending along a first surface thereof between the first end and the second end. An end portion of the optical fiber is positioned within the groove and extends from the second end, an optical fiber splicing face of the optical fiber being positioned between the first end and the second end. The assembly also comprises an optical fiber stub positioned within the groove and extending from the first end, a stub splicing face of the optical fiber stub being positioned opposite the optical fiber splicing face. A splice anvil is slidably mounted about the elongate member adjacent the first surface for movement between a released position and a clamped position, an inner surface of the anvil comprising a clamping surface overlapping the stub splicing face and the optical fiber splicing face. The assembly further comprises a clamping mechanism comprising a plurality of step surfaces arranged along the first surface of the elongate member adjacent the alignment groove. When in the released position, the inner surface of the anvil cooperates with the plurality of step surfaces. When the anvil is moved towards the first end from the released position to the clamped position, the movement gives rise to a corresponding movement of the inner surface of the anvil along the plurality of step surfaces in a direction perpendicular to the longitudinal axis and towards the first surface, a clamping surface of the anvil bringing a corresponding clamping force to bear on the optical fiber stub and the optical fiber.

In accordance with the present invention, there is also provided a method for reversibly terminating an optical fiber to an optical fiber stub. The method comprises providing a connector assembly comprising an elongate housing comprising a front end, a rear end and a cavity extending therebetween along a longitudinal axis. The connector assembly further comprises an elongate member mounted within the cavity and comprising a first end, a second end and an alignment groove extending along a first surface thereof between the first end and the second end. The connector assembly also comprises a splice anvil slidably mounted about the elongate member adjacent the first surface for movement between a released position and a clamped position, an inner surface of the anvil comprising a clamping surface. The connector assembly further comprises a clamping mechanism comprising a plurality of step surfaces arranged along the first surface of the elongate member adjacent the alignment groove, wherein when in the released position the inner surface of the splice anvil cooperates with the plurality of step surfaces. The method further comprises positioning an end portion of the optical fiber within the groove, the end portion extending from the second end and an optical fiber splicing face of the optical fiber being positioned between the first end and the second end. The method also comprises positioning the optical fiber stub within the groove, the optical fiber stub extending from the first end, a stub splicing face of the optical fiber stub being positioned opposite the optical fiber splicing face, and a clamping surface of the anvil overlapping the stub splicing face and the optical fiber splicing face. The method also comprises moving the anvil towards the first end from the released position to the clamped position. The movement gives rise to a corresponding movement of the inner surface of the anvil along the plurality of step surfaces in a direction perpendicular to the longitudinal axis and towards the first surface. A clamping surface of the anvil brings a corresponding clamping force to bear on the optical fiber stub and the optical fiber.

Other objects, advantages and features of the present invention will become more apparent upon reading of the following non-restrictive description of specific embodiments thereof, given by way of example only with reference to the accompanying drawings.

DETAILED DESCRIPTION OF THE ILLUSTRATIVE EMBODIMENTS

Figure 1:
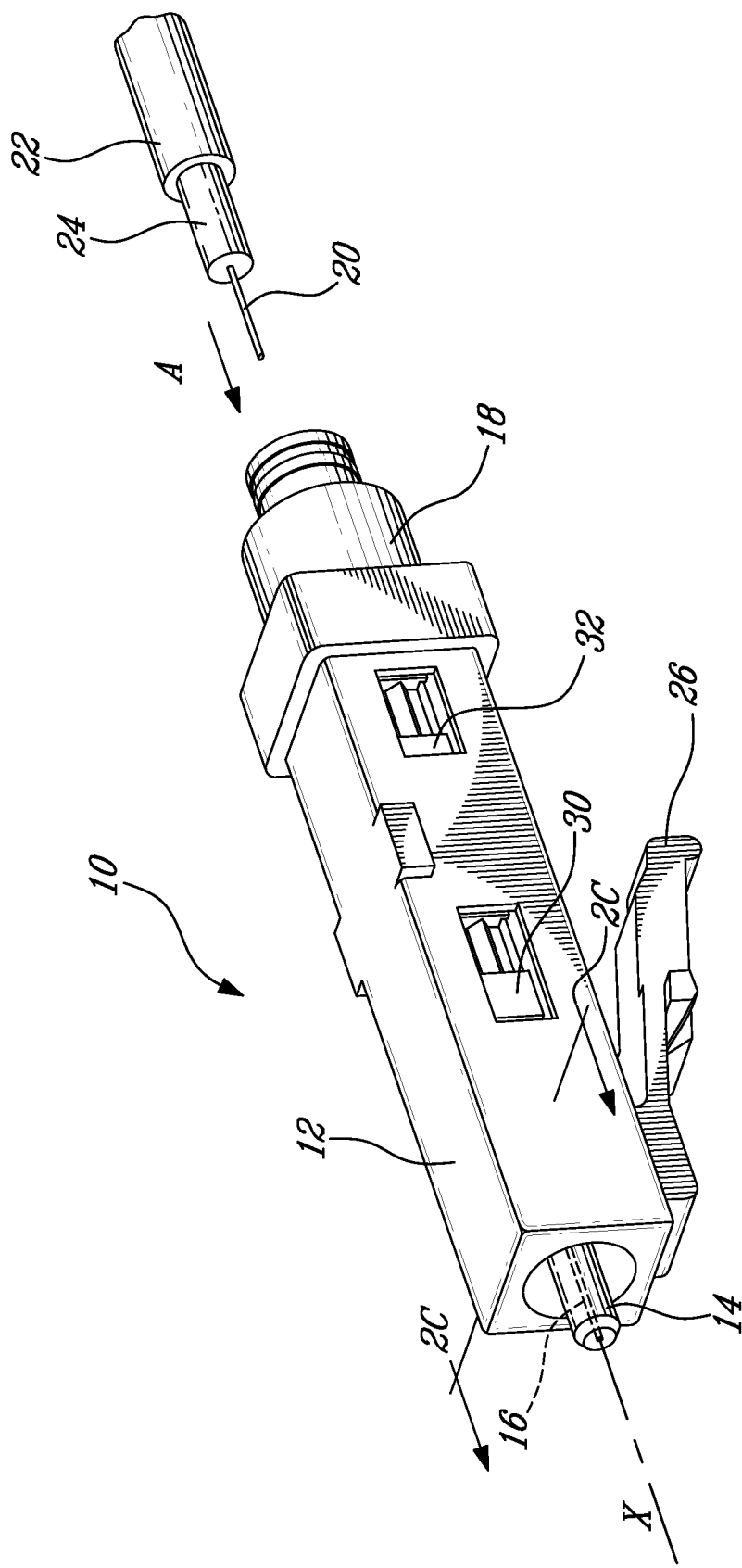
FIG. 1 is a perspective view of a reversible fiber connector with mechanical sliding splice in accordance with an illustrative embodiment of the present invention.
Figure 2A:
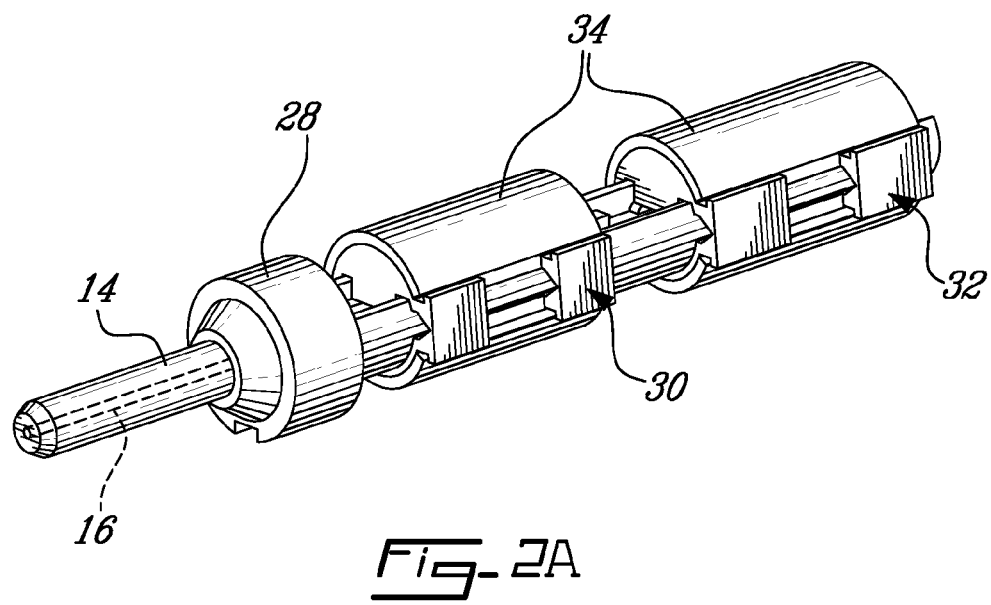
FIG. 2A is a perspective view of the clamping mechanism of the reversible fiber connector of FIG. 1 with the mechanical sliding splice in a released position in accordance with an illustrative embodiment of the present invention.
Figure 2B:
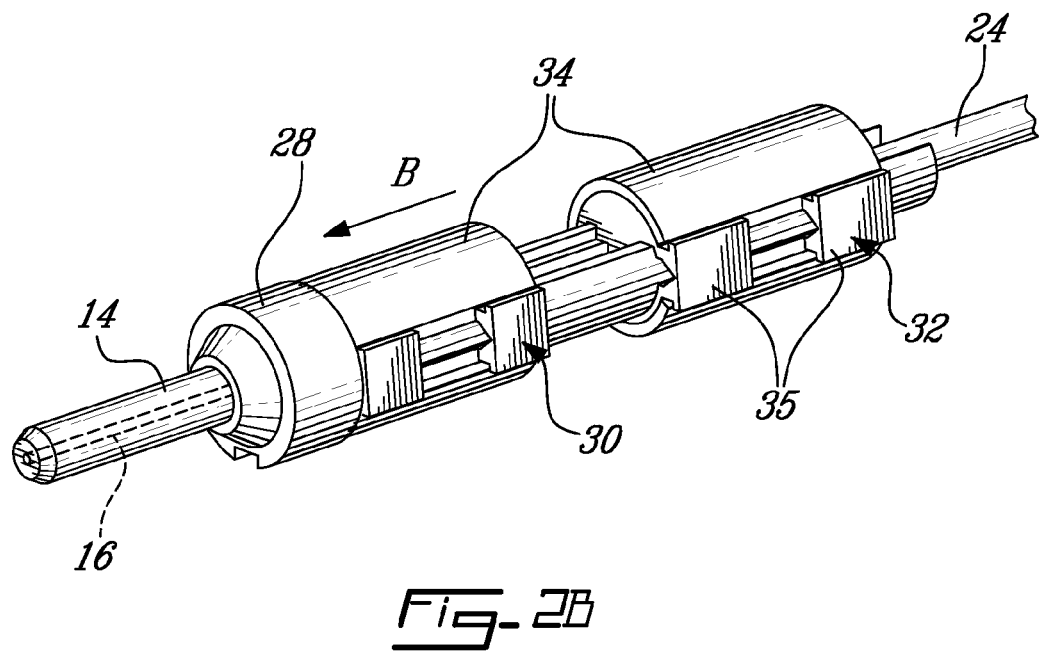
FIG. 2B is a perspective view of the clamping mechanism of the reversible fiber connector of FIG. 1 with the mechanical sliding splice in a clamping position in accordance with an illustrative embodiment of the present invention.
Figure 2C:
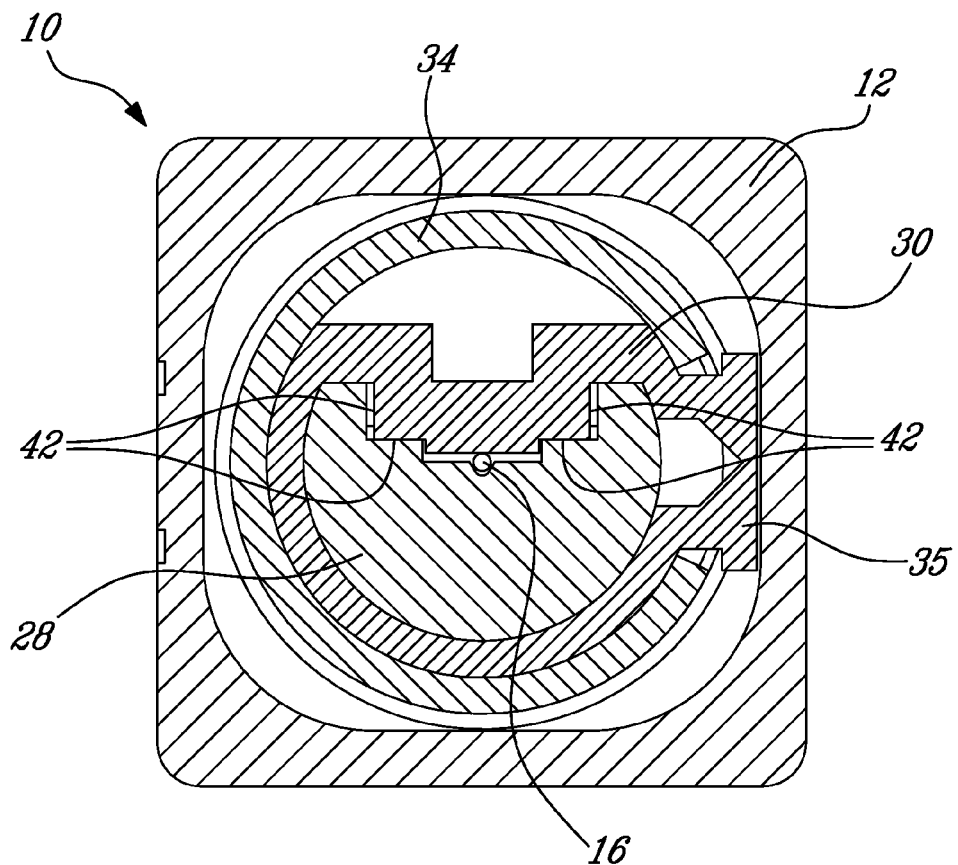
FIG. 2C is a cross-sectional view taken along the line 2c-2c of FIG. 1 in accordance with an illustrative embodiment of the present invention.
Figure 2D:
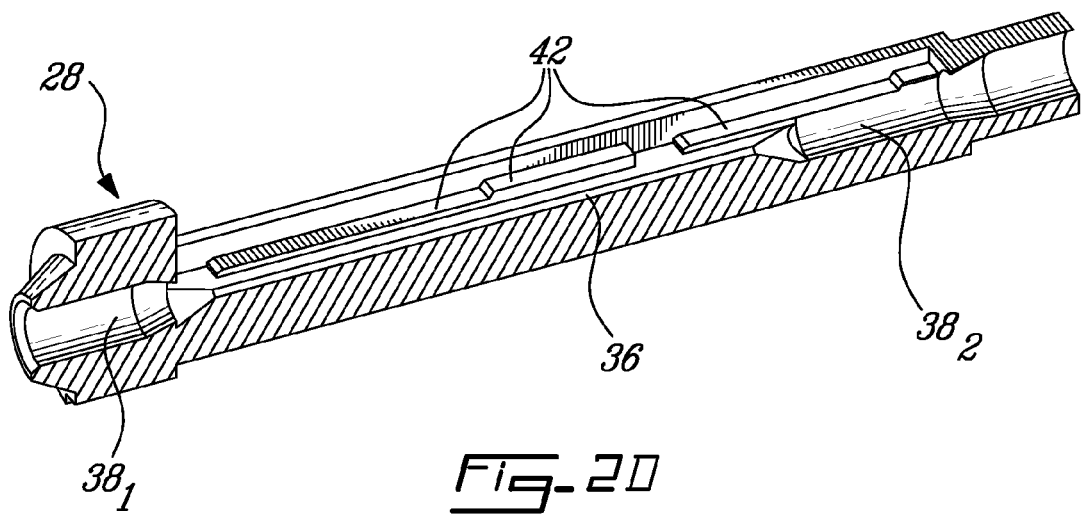
FIG. 2D is a sectional perspective view of a ferrule holder in accordance with an illustrative embodiment of the present invention.
Figure 3A:
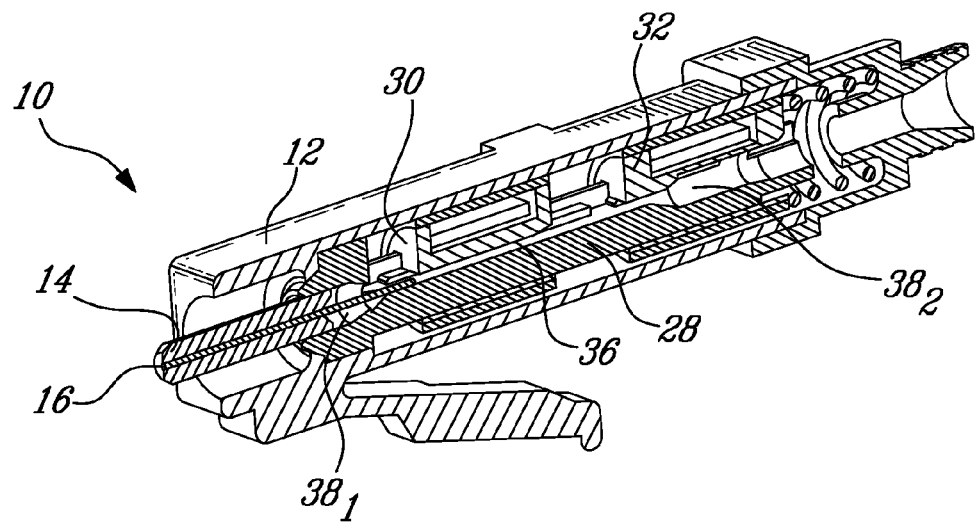
FIG. 3A is a sectional perspective view of the reversible fiber connector of FIG. 1 with no fiber inserted therein in accordance with an illustrative embodiment of the present invention.
Figure 3B:
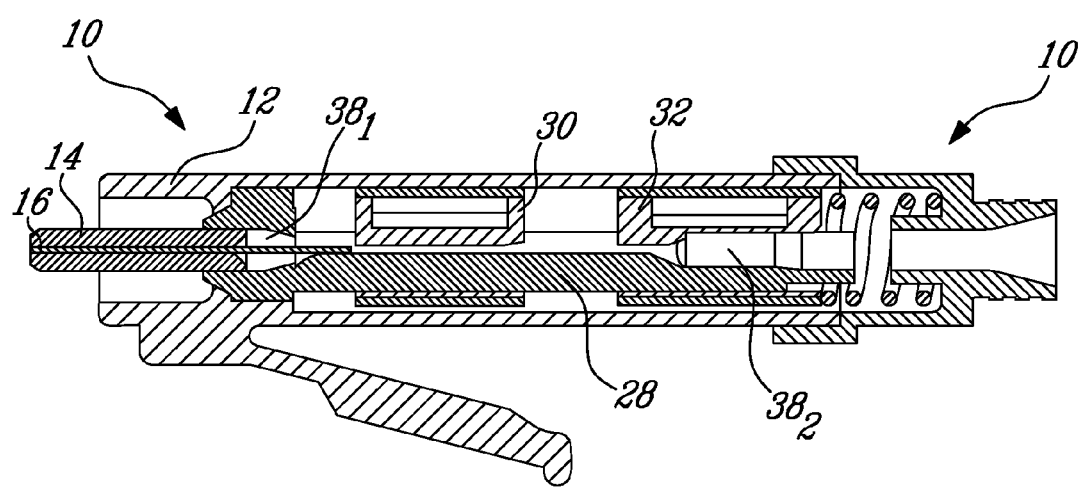
FIG. 3B is a front side view of the reversible fiber connector of FIG. 3A in accordance with an illustrative embodiment of the present invention.
Figure 4A:
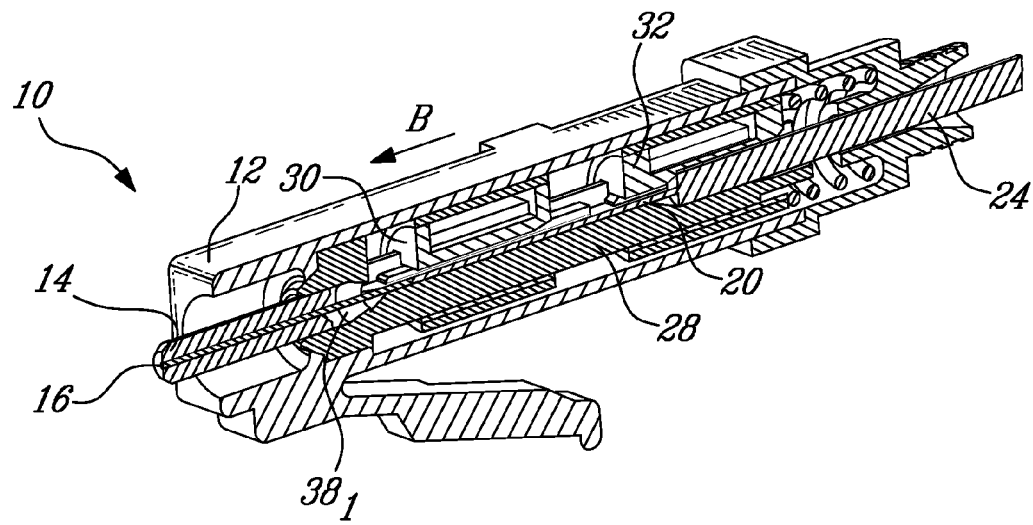
FIG. 4A is a sectional perspective view of the reversible fiber connector of FIG. 1 with the mechanical sliding splice in a released position and the fiber in a final position in accordance with an illustrative embodiment of the present invention.
Figure 4B:
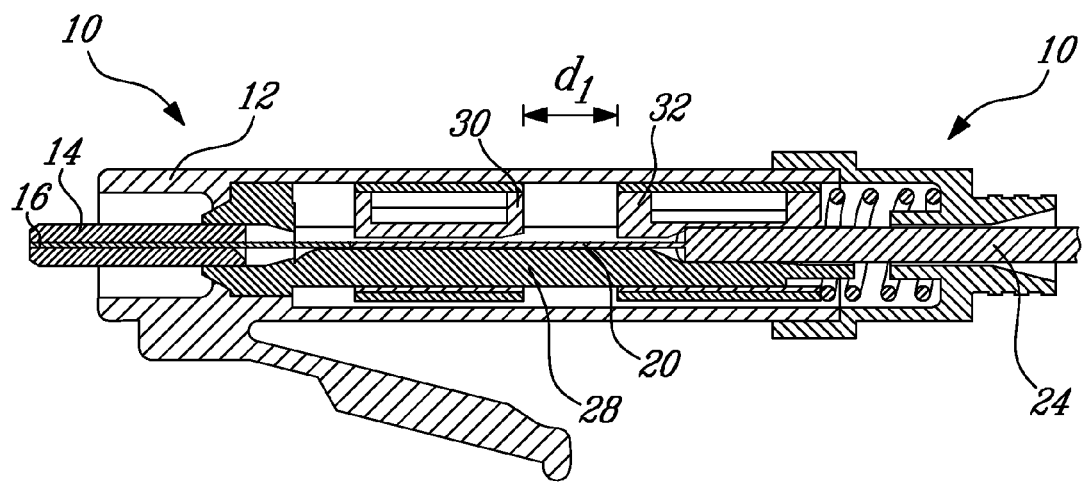
FIG. 4B is a front side view of the reversible fiber connector of FIG. 4A in accordance with an illustrative embodiment of the present invention.
Figure 5A:
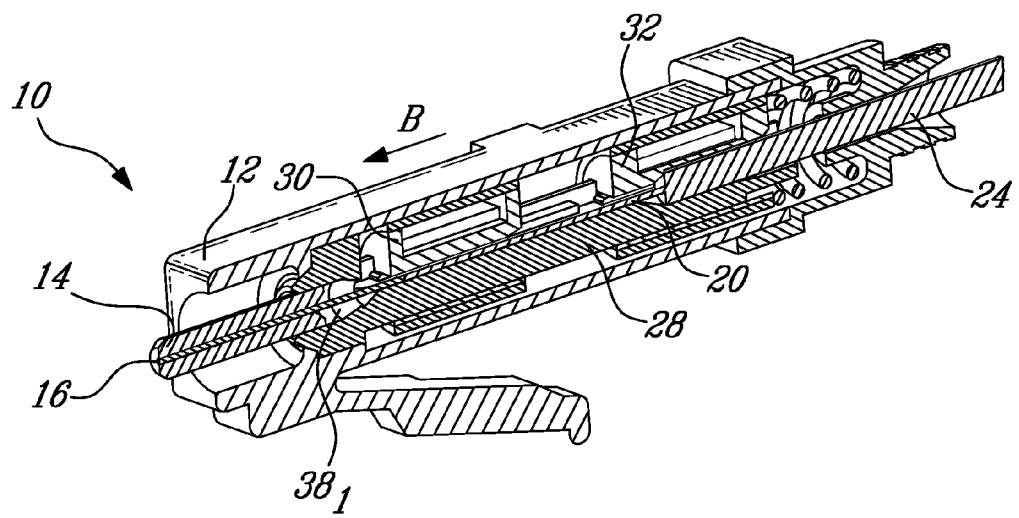
FIG. 5A is a sectional perspective view of the reversible fiber connector of FIG. 1 with the mechanical sliding splice in an intermediate position and the fiber in a final position in accordance with an illustrative embodiment of the present invention.
Figure 5B:
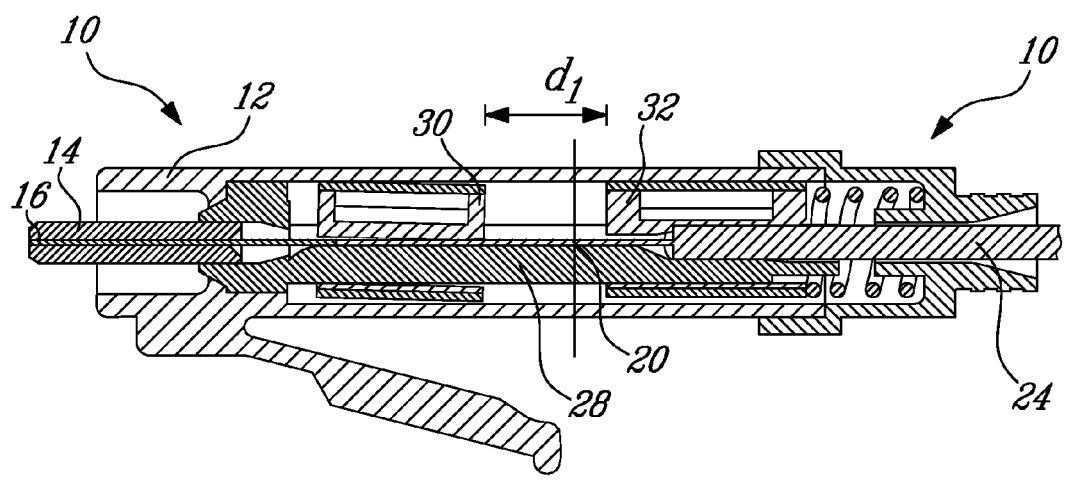
FIG. 5B is a front side view of the reversible fiber connector of FIG. 5A in accordance with an illustrative embodiment of the present invention.

Referring now to FIG. 1, and in accordance with an illustrative embodiment of the present invention, a reversible fiber connector assembly, generally referred to using the reference numeral 10, will now be described. The connector 10 is illustratively a re-terminable, no-crimp Local Connector (LC)-type optical connector that comprises a housing 12 having a front end, in which a ferrule 14 having affixed thereto an optical fiber stub 16 is received. The connector 10 further comprises at a rear end thereof opposite the ferrule 14 a backbone 18 through which a mating optical fiber 20 is inserted into the connector 10 along the direction of arrow A for termination. The optical fiber 20 is illustratively prepared for insertion into the connector 10 by removing a portion of the cable jacket 22 and coated or buffered portion 24 to expose a predetermined length of the bare glass fiber 20. A tab 26 is further provided on a lower surface (not shown) of the connector 10 for insertion and retention thereof into an appropriately configured port of a patch panel or other device (both not shown) to permit signals to pass from the optical fiber 20 to the device and vice-versa.

Referring now to FIG. 2A, FIG. 2B, FIG. 2C and FIG. 2D in addition to FIG. 1, the connector housing 12 is illustratively elongate and comprises a cavity (not shown) extending between the front and rear ends of the connector 10 along a longitudinal axis X. An elongate ferrule holder 28 is disposed in the housing cavity and surrounds the end of the ferrule 14, in which the fiber stub 16 is received for retention thereof. The housing 12 further comprises a clamping mechanism mounted to the ferrule holder 28 for termination of the fibers 16, 20 and comprising a first mechanical splice anvil 30 used to maintain the fiber stub 16 and the optical fiber 20 in alignment as well as a second mechanical splice anvil 32 positioned adjacent the first anvil 30 along the axis X and used to exert pressure on the buffered portion 24 and on the bare fiber 20, as will be discussed in further detail herein below. The first and second anvils 30, 32 are illustratively slidably mounted about the ferrule holder 28 for independent movement along the axis X towards the front end of the connector 10 (i.e. along the direction of arrow B). In this manner, the anvils 30, 32 are moveable from a released position (illustrated in FIG. 2A), in which no pressure is applied by the anvils 30, 32 and the fiber 20 can be freely inserted through the rear end of the connector 10 for mating with the fiber stub 16, to a clamping (or clamped) position (illustrated in FIG. 2B), in which radial pressure is applied by the anvils 30, 32 on the fiber stub 16 and the optical fiber 20 as well as on the buffered portion 24 to ensure proper mating and alignment of a stub splicing face (not shown) of the fiber stub 16 with an optical fiber splicing face (not shown) of the optical fiber 20 for accurate termination. In addition, the anvils 30, 32 are each surrounded by a slit sleeve spring 34, which ensures that the pressure applied by the anvils 30, 32 on the fibers 16, 20 and on the buffered portion 24 of the cable 22 is maintained when the anvils 30, 32 are moved to the clamping position. Also, in order to ease gripping of the anvils 30, 32 to impart sliding motion thereon, projections as in 35 are illustratively provided thereon, thus facilitating actuation of the clamping mechanism.

Still referring to FIG. 2A, FIG. 2B, FIG. 2C and FIG. 2D in addition to FIG. 1, an alignment groove (V-shaped or "V-groove") 36 is illustratively provided on a substantially flat inner surface of the ferrule holder 28 and extends between front and rear ends of the ferrule holder 28 along the axis X. The groove 36 has at each end thereof a funnel-shaped lead-in portion $38_1$, $38_2$, which provides a smooth transition for the fibers 16 and 20 to be routed into the groove 36 from either end of the connector 10, thus protecting the end face (not shown) of the fibers 16, 20 from damage. As will be apparent to a person skilled in the art, although a V-groove 36 has been shown for illustrative purposes, the alignment groove 36 could have any other shape (e.g. square or "U-groove") suitable for receiving and aligning the fiber stub 16 and the adjoining optical fiber 20 within the connector 10. Also, although only one alignment groove 36 has been illustrated, it will be apparent to a person skilled in the art that the connector 10 may be provided with a plurality of alignment grooves as in 36 to accommodate a dual-fiber or multi-fiber connector having two (2) or more fiber stubs as in 16.

Referring now to FIG. 3A, FIG. 3B, FIG. 4A and FIG. 4B in addition to FIG. 1, the first groove portion $38_1$ is illustratively positioned adjacent the ferrule 14 to facilitate the positioning and centering of the fiber stub 16 inside the ferrule 14 and of a protruding end (not shown) of the fiber stub 16 within the groove 36. For this purpose, the ferrule 14 illustratively comprises an axial bore (not shown), which is aligned with the groove 36 and in which the fiber stub 16 is disposed with the protruding end extending away from the front end of the housing 12. The second groove portion $38_2$ is used to position the buffered portion 24 and accordingly insert and advance the fiber 20 freely within the connector housing 12 along the groove 36 (with the anvils 30, 32 in the released position) until the fiber 20 reaches a final centered position (see FIGS. 4A and 4B) and the optical fiber splicing face of the fiber 20 extends within the housing 12 from the rear end of the connector 10 towards the front end to make physical contact with the stub splicing face of the fiber stub 16. Illustratively, index-matching gel may be provided in the area of the groove 36 where the fibers 16 and 20 mate to refractively limit signal loss at the interface of the optical fiber 16 and the fiber stub 20 once the latter are properly aligned.

Referring now to FIG. 5A, FIG. 5B, FIG. 6A and FIG. 6B, the anvils 30, 32 are illustratively positioned adjacent the groove 36, with a clamping surface (not shown) of the anvil 30 being adjacent the stub splicing face and the optical fiber splicing face of the adjoining fiber 20 and fiber stub 16. Once the optical fiber 20 and the fiber stub 16 are mated, the first mechanical anvil 30 is slid along the direction of arrow B towards the front end of the connector 10 away from the second anvil 32 (intermediate position illustrated in FIG. 5A and FIG. 5B) until the anvil 30 reaches the clamping position (illustrated in FIG. 6A and FIG. 6B), with the distance $d_1$ between the anvils 30 and 32 being therefore increased. In the clamping position, the anvil 30 illustratively abuts against the front end (not shown) of the ferrule holder 28. As a result, the clamping surface of the anvil 30 overlaps the area of the groove 36 where the stub splicing face and optical fiber splicing face of the stub fiber 16 and the optical fiber 20 mate and exerts a clamping force on the adjoining optical fiber 20 and fiber stub 16, which are thereby compressed to better retain the fibers 16 and 20 in alignment relative to one another within the groove 36. To effect termination of the optical fiber 20, the second mechanical anvil 32 is also slid along the direction of arrow B towards the first anvil 30 to a clamping position. As a result, radial pressure is also applied on the buffered portion 24 of the cable 22 as well as on the optical fiber 20 to better retain the latter within the connector housing 12. The optical fiber 20 is thus more accurately terminated and the connector 10 can subsequently be mated to an appropriate port or other connector (both not shown). A spring 40 illustratively provides compressive resistance behind the ferrule 14, thus ensuring adequate contact pressure between the ferrule 14 and a contact point on the port.

Figure 6A:
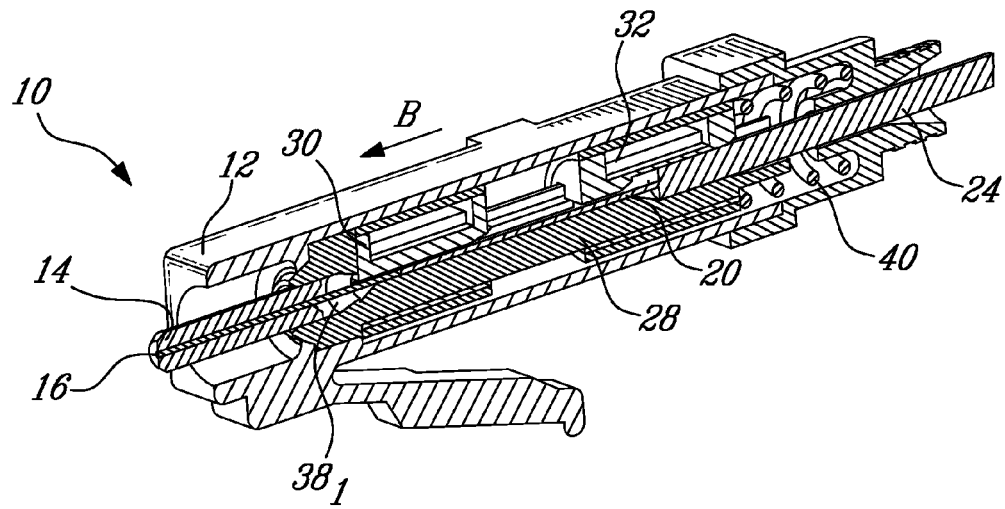
FIG. 6A is a sectional perspective view of the reversible fiber connector of FIG. 1 with the mechanical sliding splice in a clamping position and the fiber in a final position in accordance with an illustrative embodiment of the present invention.
Figure 6B:
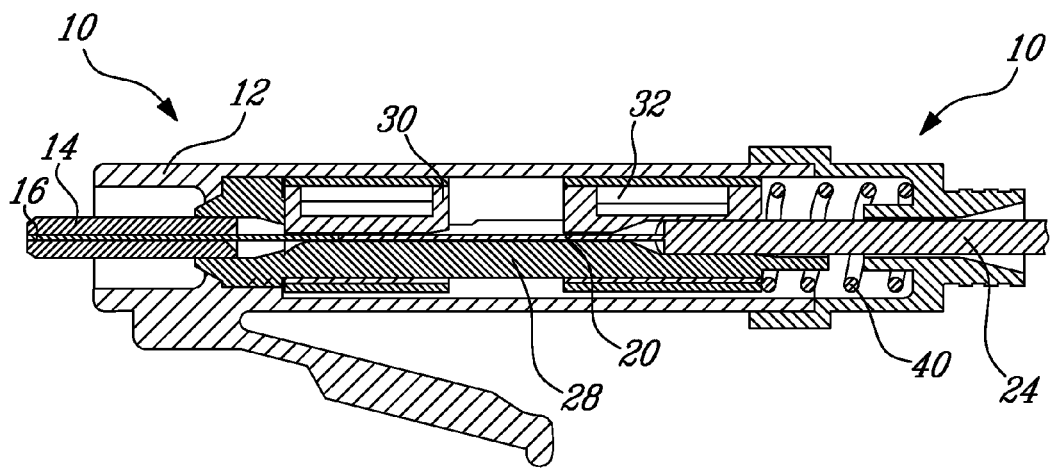
FIG. 6B is a front side view of the reversible fiber connector of FIG. 6A in accordance with an illustrative embodiment of the present invention.

Referring back to FIG. 2D in addition to FIG. 6A, the flat inner surface of the ferrule holder 28 further comprises a plurality of step surfaces as in 42, which cooperate with the splice anvils 30, 32 to effect the clamping mechanism that urges the clamping surfaces of the anvils 30, 32 against the adjoining fiber stub 16 and optical fiber 20 as the anvils 30, 32 are slid along directional arrow B, as discussed herein above. For this purpose, the anvils 30, 32 are illustratively slidably mounted on the step surfaces 42 such that, as the anvils 30, 32 are displaced along the axis (reference X in FIG. 1) in the direction of arrow B, they are guided by the multiple step surfaces 42 and the anvils 30, 32 are moved downwardly (or alternatively upwardly if the anvils 30, 32 are displaced in the direction opposite to that of arrow B) and closer to (or further away from) the inner surface of the ferrule holder 28 along a direction perpendicular to the axis X. Accordingly, the clamping surfaces of the anvils 30, 32 are positioned closer to (or further away from) the groove 36, in which the adjoining fibers 16, 20 are retained. The mechanical movement provided by the step surfaces as in 42 therefore advantageously allows to adjust (i.e. add or remove) the amount of radial pressure applied by the anvils 30, 32 on the adjoining fibers 16, 20 by enabling the anvils 30, 32 to move upward or downward along the step surfaces as in 42.

Referring back to FIG. 1, the termination mechanism of the present invention has the added advantage of being simple as well as non-destructively reusable. This is effected by returning the slit sleeve spring 34 and associated anvils 30, 32 to the original released position, thus releasing clamping forces on both the optical fiber 20 and the fiber stub 16. The optical fiber 20 may then be withdrawn from the connector 10 (after having been terminated) and subsequently reinserted for another attempt at a successful connection in the event where optical continuity between the fibers 16 and 20 has been deemed unacceptable. The connector 10 therefore eliminates the need for any extra and irreversible operation to crimp a lead-in tube or annular crimp ring about the buffered portion 24 of the fiber cable 22 and provide strain relief to the interface of the aligned fiber stub 16 and field fiber 20, as is the case of conventional connectors. As the crimp is destructive, such crimping typically degrades the fiber interface and such degraded connection cannot be improved short of cutting away the wasted connector, re-stripping, re-cleaving, and re-terminating the optical fiber 20 with a new fiber stub 16 in a new connector 10.

In addition and still referring to FIG. 1, the assembly of the present invention is advantageously adaptable to various types of fiber connectors, such as fiber connectors conformed to the Straight Tip (ST), Standard Connector (SC), or hybrid fiber and electrical contact standards. Moreover, the use of two (2) anvils as in 30 and 32 enables to more accurately control the termination of the optical fiber 20 as pressure may be simultaneously applied on the buffered portion 24 and the length of the fiber 20 (by anvil 32) as well as on the mating region (by anvil 30), thus better aligning and retaining the fibers 16 and 20 within the connector 10.

Although the present invention has been described hereinabove by way of specific embodiments thereof, it can be modified, without departing from the spirit and nature of the subject invention as defined in the appended claims.

What is claimed is:

1. A connector assembly for reversibly terminating an optical fiber, the assembly comprising an elongate housing comprising a front end, a rear end and a cavity extending therebetween along a longitudinal axis, the assembly comprising:

an elongate member mounted within the cavity and comprising a first end, a second end and an alignment groove extending along a first surface thereof between said first end and said second end, wherein an end portion of the optical fiber is positioned within said groove and extending from said second end, wherein an optical fiber splicing face of the optical fiber is positioned between said first end and said second end;

an optical fiber stub positioned within said groove and extending from said first end, wherein a stub splicing face of said optical fiber stub is positioned opposite said optical fiber splicing face;

a splice anvil slidably mounted about said elongate member adjacent said first surface for movement between a released position and a clamped position, an inner surface of said anvil comprising a clamping surface overlapping said stub splicing face and said optical fiber splicing face; and a clamping mechanism comprising a plurality of step surfaces arranged along said first surface of said elongate member adjacent said alignment groove, wherein when in said released position said inner surface of said anvil cooperates with said plurality of step surfaces and wherein when said anvil is moved towards said first end from said released position to said clamped position, said movement gives rise to a corresponding movement of said inner surface of said anvil along said plurality of step surfaces in a direction perpendicular to the longitudinal axis and towards said first surface, said clamping surface of said anvil bringing a corresponding clamping force to bear on said optical fiber stub and the optical fiber.

2. The connector assembly of claim 1, further comprising a ferrule comprising a front face, a rear end positioned adjacent said first end of said elongate member, an axial bore aligned with said groove, wherein said optical fiber stub is disposed in said bore and extends from said front face into said groove.

3. The connector assembly of claim 2, wherein said elongate member is a ferrule holder.

4. The connector assembly of claim 1, wherein when in said released position, said clamping surface and said first surface are spaced for enabling said positioning of said end portion of the optical fiber and of said optical fiber stub within said groove.

5. The connector assembly of claim 4, wherein said groove comprises adjacent said first end of said elongate member a first groove portion for guiding said positioning of said optical fiber stub within said groove and said groove comprises adjacent said second end a second groove portion for guiding said positioning of said end portion of the optical fiber within said groove.

6. The connector assembly of claim 5, wherein said groove is substantially V-shaped and said first and said second groove portions are substantially funnel-shaped.

7. The connector assembly of claim 1, wherein said splice anvil is moveable from said released position to said clamped position by sliding said splice anvil about said elongate member along the longitudinal axis towards said first end, and further wherein said splice anvil is moveable from said clamped position back to said released position for reversibly terminating the optical fiber by sliding said splice anvil about said elongate member along the longitudinal axis towards said second end.

8. The connector assembly of claim 1, further comprising a slit sleeve spring mounted about said splice anvil for maintaining said clamping force to bear on said optical fiber stub and the optical fiber when said splice anvil is moved to said clamped position.

9. The connector assembly of claim 1, further comprising a projection extending away from said splice anvil for facilitating gripping thereof when moving said splice anvil.

10. The connector assembly of claim 1, further comprising a second splice anvil slidably mounted about said elongate member adjacent said first surface and adjacent said splice anvil along the longitudinal axis, an inner surface of said second anvil comprising a clamping surface overlapping said end portion of the optical fiber positioned within said groove.

11. The connector assembly of claim 10, wherein the optical fiber comprises a bare fiber coated by a buffered portion, and further wherein at said end portion said buffered portion is removed to expose said bare fiber, said clamping surface of said second anvil overlapping both said bare fiber and said buffered portion.

12. The connector assembly of claim 10, wherein when said second anvil is moved towards said first end to said clamped position, said movement gives rise to a corresponding movement of said inner surface of said second anvil along said plurality of step surfaces in said direction perpendicular to the longitudinal axis and towards said first surface, said clamping surface of said second anvil bringing a corresponding second clamping force to bear on said end portion of the optical fiber.

13. A method for reversibly terminating an optical fiber to an optical fiber stub, the method comprising:
providing a connector assembly comprising
an elongate housing comprising a front end, a rear end and a cavity extending therebetween along a longitudinal axis;
an elongate member mounted within said cavity and comprising a first end, a second end and an alignment groove extending along a first surface thereof between said first end and said second end;
a splice anvil slidably mounted about said elongate member adjacent said first surface for movement between a released position and a clamped position, an inner surface of said anvil comprising a clamping surface; and
a clamping mechanism comprising a plurality of step surfaces arranged along said first surface of said elongate member adjacent said alignment groove, wherein when in said released position said inner surface of said splice anvil cooperates with said plurality of step surfaces;
positioning an end portion of the optical fiber within said groove, said end portion extending from said second end and an optical fiber splicing face of the optical fiber being positioned between said first end and said second end;
positioning the optical fiber stub within said groove, the optical fiber stub extending from said first end, a stub splicing face of the optical fiber stub being positioned opposite said optical fiber splicing face, and said clamping surface of said anvil overlapping said stub splicing face and said optical fiber splicing face; and
moving said anvil towards said first end from said released position to said clamped position, said movement giving rise to a corresponding movement of said inner surface of said anvil along said plurality of step surfaces in a direction perpendicular to said longitudinal axis and towards said first surface, said clamping surface of said anvil bringing a corresponding clamping force to bear on the optical fiber stub and the optical fiber.

14. The method of claim 13, wherein said connector assembly comprises a ferrule comprising a front face, a rear end positioned adjacent said first end of said elongate member, an axial bore aligned with said groove, and further wherein positioning the optical fiber stub comprises disposing the optical fiber stub in said bore, the optical fiber stub extending from said front face into said groove.

15. The method of claim 13, further comprising moving said anvil from said clamped position back to said released position for reversibly terminating the optical fiber by sliding said anvil about said elongate member along said longitudinal axis towards said second end.

16. The method of claim 13, further comprising providing a second splice anvil and slidably mounting said second splice anvil about said elongate member adjacent said first surface and adjacent said splice anvil along said longitudinal axis, an inner surface of said second anvil comprising a clamping surface overlapping said end portion of the optical fiber.

17. The method of claim 16, wherein the optical fiber comprises a bare fiber coated by a buffered portion, and further wherein the method comprises, prior to said positioning said end portion of the optical fiber within said groove, removing at said end portion said buffered portion to expose said bare fiber.

18. The method of claim 17, wherein said clamping surface of said second anvil overlaps both said bare fiber and said buffered portion.

19. The method of claim 16, wherein when said second anvil is moved towards said first end to said clamped position, said movement gives rise to a corresponding movement of said inner surface of said second anvil along said plurality of step surfaces in said direction perpendicular to said longitudinal axis and towards said first surface, said clamping surface of said second anvil bringing a corresponding second clamping force to bear on said end portion of the optical fiber.

* * * * *